(No Model.)   2 Sheets—Sheet 1.

T. KIRCHHOFF.
EXPANSIBLE PULLEY.

No. 601,660.  Patented Apr. 5, 1898.

Witnesses  Inventor
Theodor Kirchhoff
by
Attorneys (No Model.) 2 Sheets—Sheet 2.
T. KIRCHHOFF.
EXPANSIBLE PULLEY.
No. 601,660. Patented Apr. 5, 1898.
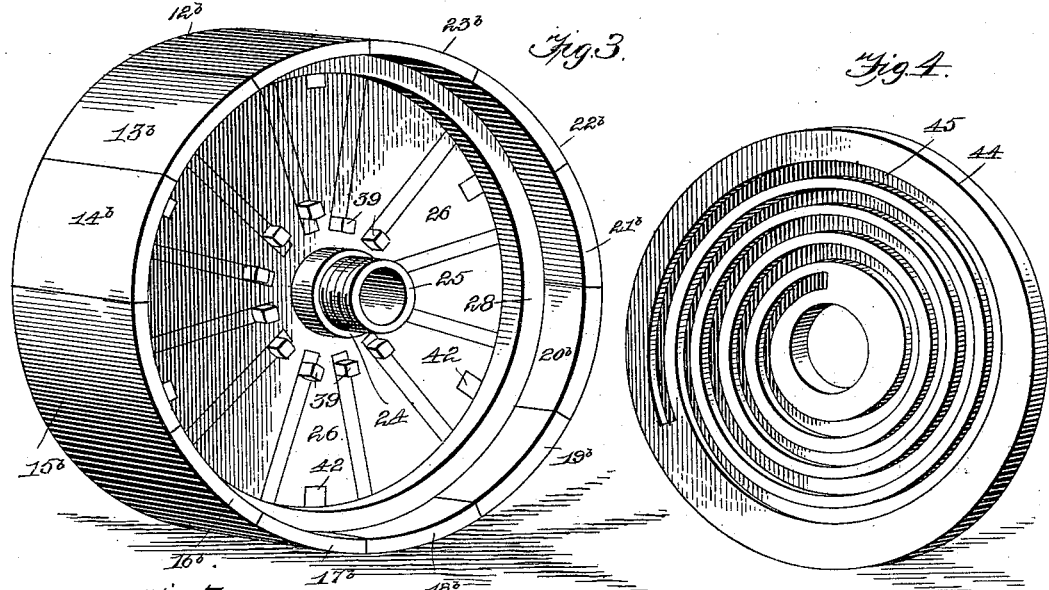
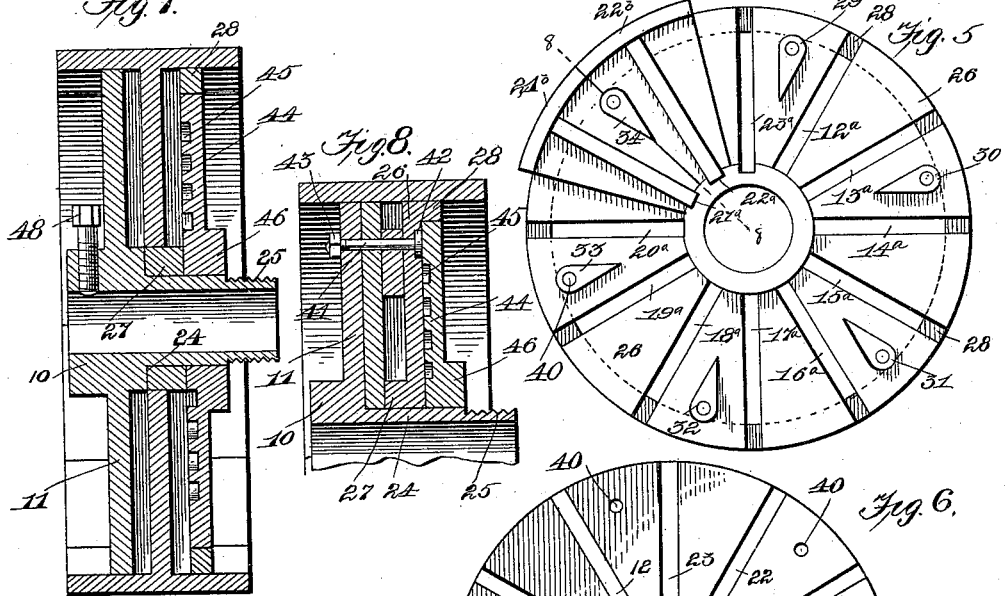
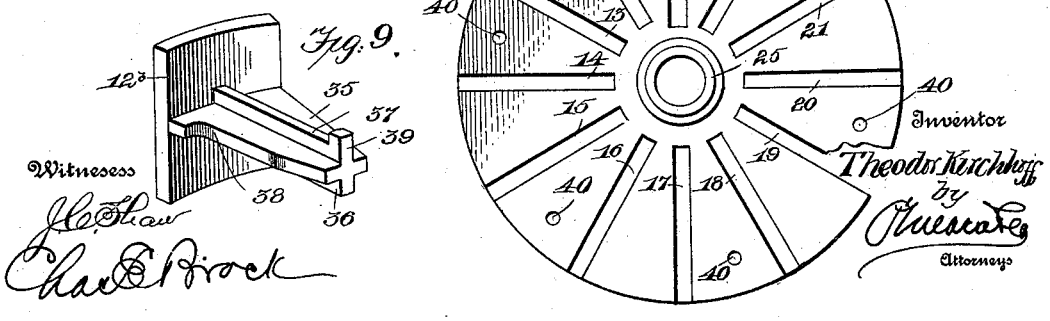
Witnesses
Inventor
Theodor Kirchhoff
Attorneys

UNITED STATES PATENT OFFICE.

THEODOR KIRCHHOFF, OF MILWAUKEE, WISCONSIN.

EXPANSIBLE PULLEY.

SPECIFICATION forming part of Letters Patent No. 601,660, dated April 5, 1898.

Application filed August 11, 1897. Serial No. 647,863. (No model.)

*To all whom it may concern:*

Be it known that I, THEODOR KIRCHHOFF, a citizen of the United States of America, residing at Milwaukee, in the county of Milwaukee and State of Wisconsin, have invented a new and useful Expansible Pulley, of which the following is a specification.

My invention is in the nature of an expansible pulley, and has for its object to furnish a cheap, strong, durable, and readily-expansible pulley of this class.

With this object in view my invention consists in a pulley provided with a disk fixed to a hub and provided with a series of equidistant radial grooves, a similar disk loosely mounted on the hub, and a series of radially-adjustable sections, each consisting of a sector of the rim, having connected thereto an angular inward extension to fit between said disks and in opposite radial grooves of each disk.

My invention further consists in a pulley provided with a disk fixed to a hub and provided with a series of equidistant radial grooves, a similar disk loosely mounted on the hub, and a series of radially-adjustable sections, each consisting of a sector of the rim having connected thereto an angular inward extension to fit between said disks and in opposite radial grooves of each disk, said extensions having lateral projections to fit in a spiral groove in the inner face of an adjusting-disk loosely mounted on the hub.

My invention further consists in the improved construction, arrangement, and combination of parts hereinafter fully described and afterward specifically pointed out in the appended claims.

In order to enable others skilled in the art to which my invention most nearly appertains to make and use the same, I will now proceed to describe its construction and operation, reference being had to the accompanying drawings, in which—

Figure 1:
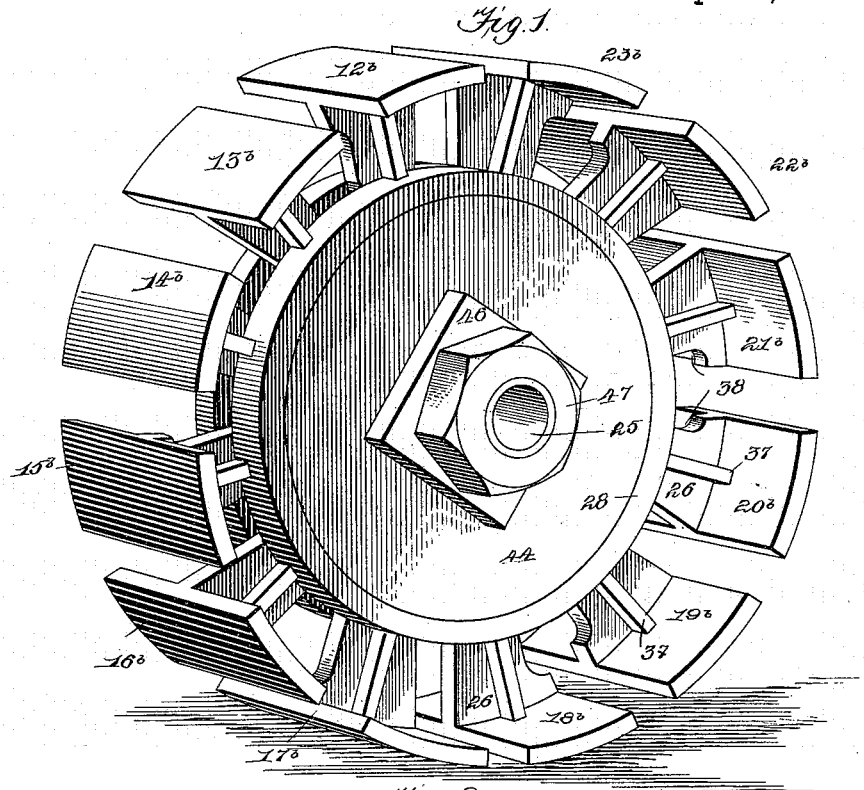
Figure 2:
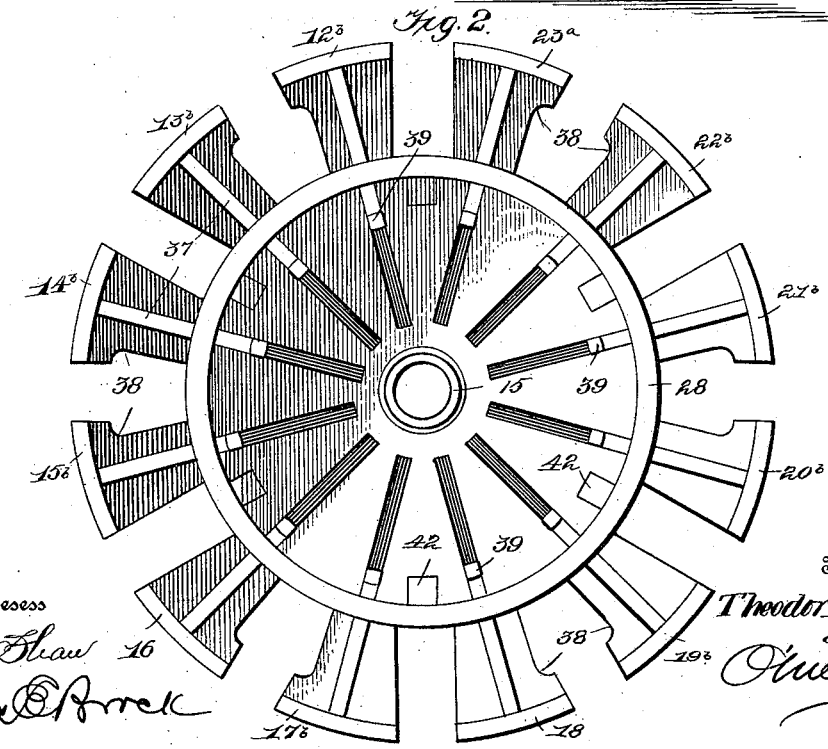

Figure 1 is a perspective view of a pulley made in accordance with my invention, with the parts in their expanded positions. Fig. 2 is a view in side elevation with the adjusting disk or plate and nut removed, the parts being in the same positions as in Fig. 1. Fig. 3 is a perspective view of the same parts illustrated in Fig. 2 in their normal or unexpanded positions. Fig. 4 is a detail perspective view illustrating the inner side of the adjusting-disk. Fig. 5 is a detail view in side elevation, illustrating the fixed slotted disk or plate with two of the radially-sliding sections attached. Fig. 6 is a detail view in side elevation, illustrating the inside of the fixed slotted disk or plate. Fig. 7 is a central vertical sectional view taken on a plane cutting through the pulley, with the parts in their unexpanded or normal positions. Fig. 8 is a vertical sectional view through one-half of the pulley on a plane cutting through one of the radially-adjustable sections and one of the spacing-blocks on the same radial line as is indicated by the dotted line 8 8 of Fig. 5. Fig. 9 is a detail perspective view illustrating one of the radially-adjustable sections detached.

Like numerals of reference mark the same parts wherever they occur in the various figures of the drawings.

Referring to the drawings by numerals, 10 is the hub of the pulley, with which is integrally formed a disk 11, provided in its inner face with a series of equidistant radial grooves 12, 13, 14, 15, 16, 17, 18, 19, 20, 21, 22, and 23, these grooves all extending inward from the circumference and gradually increasing in length from groove 12, which is the shortest, to groove 23, which is the longest, as clearly shown in Fig. 6. The hub 10 on the opposite side of the disk is reduced in diameter, as at 24, and has its outer end threaded, as at 25. Upon the extension 24 is snugly fitted a disk 26, with which is formed on its inner face a hub extension 27 and on its outer face a rim extension 28, the inner face being also provided with equidistant radial grooves to correspond or register with the radial grooves in the inner face of the disk 11. These grooves in disk 26 also extend from the circumference inward and are marked $12^a$, $13^a$, $14^a$, $15^a$, $16^a$, $17^a$, $18^a$, $19^a$, $20^a$, $21^a$, $22^a$, and $23^a$. They are not extended into the rim extension 28, whereby this extension is left solid as a reinforce or strengthening ring. The grooves $12^a$, &c., like those in disk 11, gradually increase in length from $12^a$ to $23^a$, only the four deepest ones, $20^a$, $21^a$, $22^a$, and $23^a$, extending into the hub extension 27. The disk 26 is divided into twelve sectors by these grooves, and formed upon the inner face of each alternate sector is a spacing-block, there being six of them, (marked 29, 30, 31, 32, 33, and 34.)

The rim of the pulley is divided into equal sectors, corresponding in number with the number of radial grooves in disks 11 and 26 and marked $12^b$, $13^b$, $14^b$, $15^b$, $16^b$, $17^b$, $18^b$, $19^b$, $20^b$, $21^b$, and $22^b$. Each of these sectors of the rim is provided with an inward-extending double rib or web 35 to lie between the two disks 11 and 26 and a web or double rib 36 37 to engage in the radial grooves in disks 11 and 26, the webs 35, which fit and are arranged to slide between the two disks, being cut away at one side at 38 to accommodate the spacing-blocks 29, 30, 31, 32, 33, and 34. These webs are thus made to fit closely around the spacing-blocks, thus rendering the whole structure stronger and more solid. The web or rib 36 on each of the rim-sectors is of a length and breadth to just snugly fill the corresponding radial groove of disk 11, while the rib or webs 37 fill the corresponding grooves in disk 26 and are each provided with a lug 39, which projects through the groove and beyond the outer face of the disk. These lugs are so arranged upon their webs that they will at all times be arranged in a spiral line, their distances from the center gradually increasing from the lug projecting through groove $12^a$ in disk 11, which is nearest to the center, to the lug $23^a$, which is farthest therefrom, as clearly shown in Fig. 3.

The outer face of disk 26 is provided with square recesses in each alternate sector of the disk, from which extend bores or perforations 40 through that disk, the spacing-blocks, and disk 11. Bolts 41 pass through these perforations, their heads 42 resting in the square recesses with their ends flush with the outer surface of disk 26 and provided on their ends with nuts 43 to be screwed up tightly against the outer surface of disk 11 to clamp the two disks and the rim-sectors, with their webs or ribs, together.

Fitted snugly on the extension 24 of the hub, outside of and lying against the disk 26, is the adjusting-disk 44, which also fits snugly with the rim-extension 28 of disk 26 and is provided on its inner surface with a spiral groove 45, extending from near its center to near its circumference and of a proper size and contour to permit the lugs 39 of webs 37 to fit snugly and move therein. On its outer surface it is provided with an angular central projection 46, upon which to apply a wrench for the purpose of turning it, and it is securely held in position by a nut 47, threaded upon the threaded extension 25 of the hub.

The pulley may be secured to a shaft in any desired manner, an ordinary set-bolt being shown in Fig. 7 for this purpose.

The various parts of my improved expansible pulley being assembled as hereinbefore described, and the parts being in their contracted or normal position, as shown in Figs. 3, 7, and 8, the pulley may be expanded and the rim-sectors brought to their outer positions, as shown in Figs. 1 and 2, by simply turning the adjusting-disk 44. This rotation of the disk 44 causes the lugs 39 to be moved outward by the walls of the spiral groove, all the lugs moving simultaneously and all the parts of the pulley fitting snugly together and the whole structure being at all times solid and strong. It is obvious that a reversal of the rotation of the adjusting-disk will return the rim-sectors to their contracted or normal position.

The spacing-blocks serve to keep the disks at the proper distance apart to permit the easy movement of the webs of the rim-sectors and at the same time to insure a close and snug fit, and the webs, which fit closely around them, are compelled to move in radial lines, the sides of the spacing-blocks being arranged parallel to the adjacent radial grooves.

While I have illustrated and described what I believe to be the best means for carrying out my invention, I do not wish to be understood as limiting myself to the exact construction and arrangement shown and described, but hold that such slight changes and variations as might suggest themselves to the ordinary mechanic would properly fall within the limit and scope of my invention.

Having thus fully described my invention, what I claim as new, and desire to secure by Letters Patent, is—

1. An expansible pulley comprising a disk fast upon a hub or sleeve and provided with a series of equidistant radial grooves, a similar disk mounted loosely on the hub and provided with a registering series of grooves, and a series of sectors of the rim, each carrying an angular inward extension consisting of a web lying between the two disks, a cross web or ribs lying in opposite radial grooves, one side thereof being provided with a lug projecting through the groove of the movable disk, and a disk loosely mounted on the shaft and having a spiral groove in its inner face to engage said lugs, all arranged and combined substantially as set forth.

2. An expansible pulley, comprising a disk fast upon the hub, provided with a series of radial grooves in its inner face, a disk mounted loosely on the hub and having a corresponding series of grooves extending through it, a series of rim-sectors provided with ribs to enter said grooves and a lug to project through each groove of the movable disk, and an adjusting-disk lying against the movable disk and having a spiral groove in its inner face to receive said lugs, all arranged and combined substantially as set forth.

3. An expansible pulley, comprising a disk fast upon the hub, provided with a series of radial grooves in its inner face, a disk loosely mounted on the hub and having a corresponding series of grooves extending through it, a series of spacing-blocks on its inner face between said grooves, a series of rim-sectors provided with ribs to enter said grooves and a lug to project through each groove of the movable disk, and an adjusting-disk lying against the movable disk and having a spiral groove in its inner face to receive said lugs, all arranged and combined substantially as described.

4. An expansible pulley, comprising a disk fast upon the hub, provided with a series of radial grooves in its inner face, a disk loosely mounted on the hub and having a corresponding series of grooves extending through it, a series of spacing-blocks on its inner face between said grooves, a series of rim-sectors provided with ribs to lie between the disks and fit snugly around said spacing-blocks, and ribs at right angles thereto to enter said grooves and a lug to project through each groove of the movable disk, and an adjusting-disk lying against the movable disk and having a spiral groove in its inner face to receive said lugs, all arranged and combined substantially as described.

THEODOR KIRCHHOFF.

Witnesses:
JOHN C. DICK,
JOSEPH KAISER.